United States Patent [19]
Gulitz et al.

[11] 3,718,757
[45] Feb. 27, 1973

[54] TEMPERATURE MONITORING

[75] Inventors: Louis Gulitz, Yorktown Heights; Theodore W. Kwap, Brewster; Daniel F. O'Kane, Katonah, all of N.Y.

[73] Assignee: International Business Machines Corporation, Armonk, N.Y.

[22] Filed: Dec. 29, 1970

[21] Appl. No.: 102,488

[52] U.S. Cl............178/6.8, 178/DIG. 6, 178/DIG. 8, 178/DIG. 36, 178/DIG. 37
[51] Int. Cl..........................H04n 5/26, H04n 7/18
[58] Field of Search.......178/DIG. 4, DIG. 8, DIG. 6, 178/ DIG. 36, DIG. 37

[56] References Cited

UNITED STATES PATENTS

| | | | |
|---|---|---|---|
| 2,621,246 | 12/1952 | Clayden et al. | 178/DIG. 6 |
| 3,597,534 | 8/1971 | Lidingo et al. | 178/DIG. 8 |
| 3,581,109 | 5/1971 | Olsson et al. | 178/DIG. 8 |

OTHER PUBLICATIONS

"A New Method of Television Waveform Display" by Glen Southworth, Journal of the SMPTE Sept. 1966 Vol. 75 pp. 848–850.

*Primary Examiner*—Howard W. Britton
*Attorney*—Hanifin & Jancin and John A. Jordan

[57] ABSTRACT

A television camera, such as an infrared television camera, is positioned to view a hot surface, the temperature profile of which is to be monitored and the temperature at selected points of which is to be measured. The specific application to a Czochralski type crystal puller is described. A television monitor is employed to give the temperature profile and an indicator scheme is employed with the TV monitor to allow manual positioning of the indicator to visually chosen spots on the monitor whereby the temperature at those visually chosen spots is automatically provided. The horizontal and vertical voltage used to position the pointer is also used to control a sample and hold circuit to thereby allow the sampling and holding of the video signal corresponding to the selected point. The video signal sampled is converted to digital, which digital signal may be employed to provide a visual indication of the temperature at the selected point, or alternatively, to control a process or, for example, to be processed by a computer. The particular points chosen at which temperatures are to be determined, may systematically be achieved by way of a computer.

14 Claims, 6 Drawing Figures

INVENTORS
LOUIS GULITZ
THEODORE W. KWAP
DANIEL F. O'KANE

BY John A. Jordan
ATTORNEY

TEMPERATURE MONITORING

BACKGROUND OF THE INVENTION

The present invention relates to a temperature monitoring system and method for monitoring, for example, the temperature profile exhibited by an object or surface whereby the two dimensional temperature configuration of the object or surface may be viewed and investigated. More particularly, the present invention relates to a temperature measurement and control system arrangement whereby the temperature "print" or "picture" of the exposed surface of an object may be viewed and the temperature at any selected point on the temperature "picture" measured.

One of the difficulties with prior art arrangements, designed to measure the temperature at selected points on an object, for example, resides in the fact that the true temperature profile of the object is not readily obtainable. More particularly, in typical prior art arrangements for measuring temperature, at various points on an object, a plurality of in situ heat sensors are employed, which sensors fail to give what may be considered a good temperature profile. The disadvantage of such temperature sensors resides in the fact that they have to be placed within the proximity of the object being investigated and periodically have to be relocated and replaced. In addition, the mere fact that the sensors are placed within the proximity of the object being investigated means that heat is undesirably conducted therefrom and, accordingly, a representative and true temperature reading is not obtainable. Such prior art arrangements are clearly not satisfactory, since the temperature at all the points, necessarily of interest, is not readily obtained, and such arrangements, it is clear, are cumbersome, inconvenient, and inaccurate. In addition, such arrangements do not provide any significant visual indication to allow the investigators to closely monitor the activity of the object undergoing investigation.

Some prior art arrangements do exist for providing a thermal image, but these arrangements lack accuracy and simplicity and fail to provide a system which permits rapidly selecting a number of points on the thermal profile whereby temperature measurements may be made thereat. Exemplary of such types of arrangements is that disclosed by Garbuny in U.S. Pat. No. 2,920,137.

In addition, other prior art teaches employment of television monitoring systems for the detection of flame. Exemplary of such an arrangement is that described in the September 1969 NASA Tec Brief, Brief 69-10354. However, it is clear that the infrared television system described in that Brief addresses the problem of detecting a hydrogen flame in bright sunlight and, like Garbuny, the system fails to provide an arrangement, for example, for rapidly selecting any number of points on a thermal profile and, in accordance therewith, measuring the respective temperatures thereat.

The importance of closely and accurately observing and measuring the complete temperature profile of an object under investigation is demonstrated by reference to crystal growth processes. For example, in Czochralski-type crystal puller arrangements accurate and complete temperature information is necessary for the ultimate fabrication of useful crystals. In existing arrangements for measuring the temperature, in the Czochralski process, a sapphire sensing rod, for example, is used to measure the temperature of the heater supplying the crucible and an Ircon sensing device is used to record changes in the crystal diameter. The output from these two sensors is, for example, programed into a computer to control the growth rate of the crystal. The difficulty with such an arrangement resides in the fact that the sapphire sensing rod does not measure the melt temperature directly but indicates the temperature of the crucible holding the melt. In addition, it should be noted that the sapphire sensor responds quite slowly to changes in power and, accordingly, this slow response acts to influence the crystal diameter.

Thus, as an exemplary application of the system and method, in accordance with the principles of the present invention, reference is made to conventional Czochralski crystal growth processes, whereby the noted problems of thermal lag, and the like, are overcome through the techniques employed in accordance with the present invention. Not only can the temperature, at any of a number and variety of selected points, in the Czochralski-type crystal puller process, be accurately and readily obtained but, in addition, a complete temperature profile of the crystal, as it is being grown, can be monitored and manipulations readily be made to, for example, measure the width of the crystal.

It is clear that any of a variety of processes, and investigations of objects, require an accurate and complete real-time knowledge of the temperature profile of the objects, and accurate measurement of temperature at any of a variety of selected points on the profile. In addition, some processes and investigations require or necessitate observation, measurement, and control from a remote point. Many processes and investigations require or necessitate obtaining temperature data from a multitude of points on the surface of the object under investigation. The use of conventional temperature sensors in such applications are difficult and impractical.

SUMMARY OF INVENTION

In accordance with the principles of the present invention, a television camera, such as an infrared television camera, is employed to monitor the temperature profile of a surface of an object under investigation, and to measure temperature at any of a variety of selected points within the field of view of the television camera. The points at which temperature is to be measured may, for example, be selected by employing a television monitor having a manually moveable indicator displayed thereon. The horizontal and vertical sawtooth waves employed to drive the deflection circuits of the video cathode ray tube are compared with the respective horizontal and vertical voltage levels used to position the indicator. The video signal is sampled when a compare is obtained, the video signal being indicative of the temperature at the point selected by positioning the indicator. A reference lamp is used, within the field of the view of the camera to calibrate the camera video signal. The temperature at selected points, the distance between selected points and discernable contours, can be determined by employing the system in accordance with the principles of the present invention.

It is therefore an object of the present invention to provide an improved temperature monitoring system.

It is a further object of the present invention to provide an improved temperature monitoring and measuring system which operates remotely from the object under investigation.

It is yet a further object of the present invention to provide a temperature monitoring system which operates remotely from the object under investigation and which acts to provide individual temperature measurements at selected points.

It is yet still a further object of the present invention to provide a temperature monitoring and measurement system which acts to allow for rapid temperature measurement at a multitude of points.

It is yet another object of the present invention to provide a remotely operated temperature monitoring apparatus which allows temperature measurements to be made at any of a multitude of selected points.

It is yet still another object of the present invention to provide a temperature monitoring system whereby a temperature profile or image of an object under investigation is visually displayed on a television monitor and means are provided to position an indicator, on the display surface of said monitor, to points corresponding to points on the object under investation, at which temperature is desired to be determined.

It is yet another further object of the present invention to provide a temperature monitoring and measurement system employing a television camera so as to thereby allow the temperature at any point within the field of view of the television camera to be determined and whereby, in addition to temperature, contours and width of the object under investigation and liquid level, and the like, for example, may be determined.

It is yet still another further object of the present invention to provide a temperature monitoring and control system employing an infrared television camera, with means to select points within the field of the camera, at which temperatures are to be read by sampling the video signal corresponding thereto, and whereby control apparatus may respond to the data of the selected points to control the temperature, speed, and the like, of the process operating upon the object under investigation.

DETAILED DESCRIPTION OF THE DRAWINGS

Figure 1:
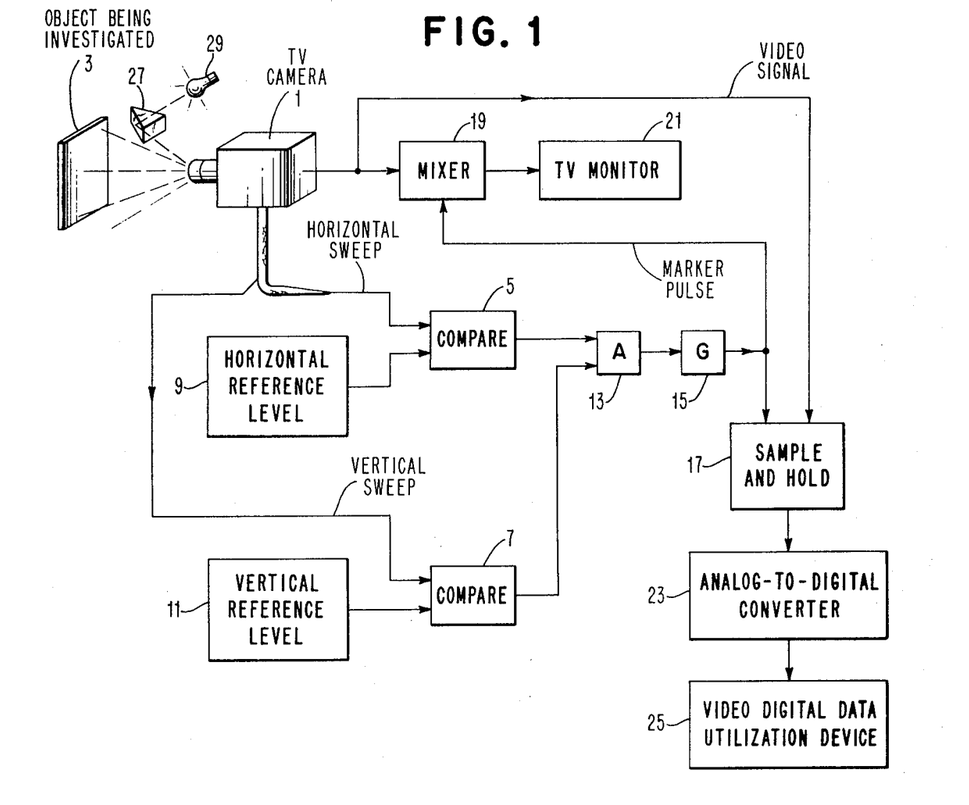
FIG. 1 shows the preferred embodiment of the temperature monitoring and measuring system in accordance with the principles of the present invention.

In accordance with the arrangement, depicted in FIG. 1, television camera 1 is arranged to view an object 3, which may be any of a variety of objects which are desired to be investigated. Television camera 1, it is clear, may be any of a variety of television cameras which are sensitive to different wavelengths of radiation. However, where the camera is merely a black and white camera, it is apparent that an insensitivity to thermal emission from an object would prevail, at lower temperatures and accordingly, when such a camera is employed, in accordance with the arrangement of FIG. 1, light patterns and profiles may be examined, and widths and contours in relation to the object under investigation determined, but no temperature measurements would be available.

It has been found that an infrared television camera will, however, be responsive to temperature emissions from the object under investigation whereby, in accordance with the principles of the present invention, temperature measurements at selected points may be obtained. In particular, it has been found that a commercially available GPL closed circuit TV system, employing a TIVICON tube in the camera, for example, produces highly effective results in monitoring and measuring temperature, in accordance with the principles of the present invention. The TIVICON tube, it is noted, generally comprises an array of silicon diodes in matrix form which act to provide a surface which responds to visible (0.5 to $0.8\mu$) and infrared (0.8 to $1.2\mu$) radiation. In this regard, it should be recognized that when the system of FIG. 1 employs an infrared television camera, it is not necessary that its application be limited to investigation of hot objects. For example, as hereinabove indicated, widths, contours, and the like, exclusive of temperature, may be determined. It should also be recognized that other types of radiation detecting television cameras may, likewise, be effective in the system, in accordance with the principles of the present invention. However, for determining temperature television cameras which typically respond from $0.5\mu$ to $5\mu$ are of practical interest and, accordingly, "infrared" television cameras, as used herein in regard to determining temperature, are intended to include all cameras within this range.

The horizontal and vertical sweep signals from television camera 1 are, as shown in FIG. 1, coupled to one of the inputs of respective compare circuits 5 and 7. The other input of the respective compare circuits 5 and 7 are coupled to horizontal and vertical, reference level voltage sources 9 and 11, respectively. The outputs of compare circuits 5 and 7 are coupled through AND gate 13 to pulse generator 15. It should be noted that AND gate 13 includes a capacitor-resistor differentiator on its input that is coupled to compare circuit 5, as will be more clear with reference to FIG. 3. The output pulse from pulse generator 15 is coupled to both sample and hold circuit 17 and mixer 19, the latter of which is coupled to television monitor 21. The pulse output from pulse generator 15 acts to enable sample and hold circuit 17 whereby, at the point in time the pulse from the pulse generator occurs, the video signal from television camera 1, corresponding in time thereto, is sampled. The sampled video signal is converted to digital in analog-to-digital converter 23.

The digital output from converter 23 is, as shown in FIG. 1, coupled to video digital data utilization device 25. In this regard, it should be clear that utilization device 25 may be any of a variety of apparatus which act to indicate, display, process or respond to the data. Accordingly, utilization device 25 may, for example, comprise a digital display device for digitally displaying temperature.

Alternatively, utilization device 25 may, for example, comprise a process control computer which receives and processes the digital data from converter 23, and in accordance therewith controls a process or stores the data for printout or display. In addition, the processed data may be employed in making calculations, for example, to be used to obtain additional information from the monitored process, under the control of the computer, in accordance with such calculations.

Figure 3:
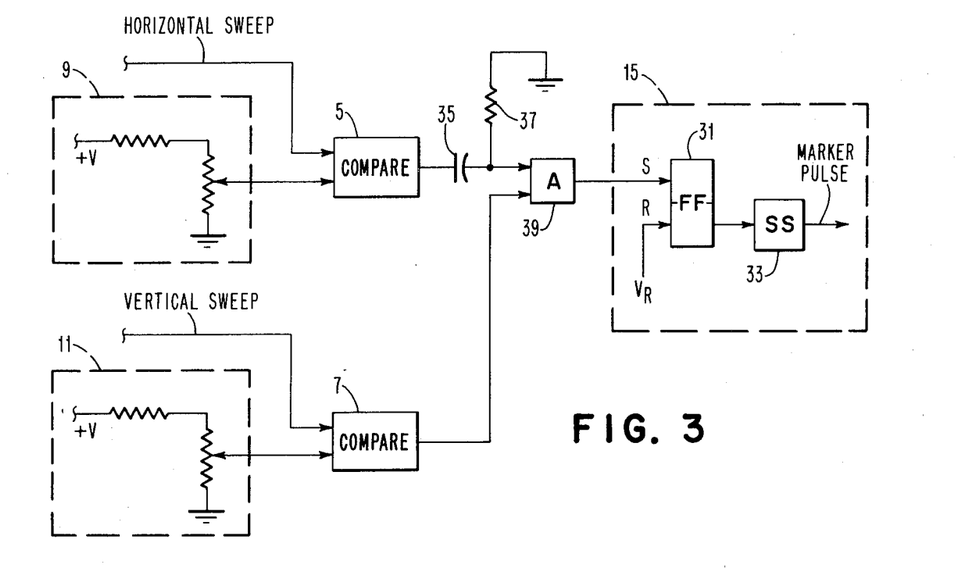
FIG. 3 shows a detailed arrangement of the compare and gating circuitry employed in FIG. 1 to generate, at the appropriate time, a marker pulse.

It should be recongnized that in the arrangement of FIG. 1 horizontal and vertical reference level voltage sources 9 and 11 act to provide voltage levels which correspond to the position of an indicator dot to be generated upon the display surface of the cathode ray tube of TV monitor 21. Most simply, the horizontal and vertical reference level voltage sources 9 and 11 may comprise a pair of potentiometers, as shown in FIG. 3. It is clear that the potentiometers could be mechanically coupled to a pair of conveniently operated knobs which would allow manual adjustment of the X and Y coordinate position of the dot generated on monitor 21. In this regard it should be recognized that the dot may be positioned to any point within the display surface of the television monitor 21, which area corresponds to the field of view, as seen by television camera 1.

In addition to object 3 being within the field of view of television camera 1, it can be seen, in FIG. 1, that a prism arrangement 27 is also positioned therein, in a manner so as to guide light from lamp 29 to the camera lens. The function of lamp 29, and the corresponding prism arrangement 27, is to provide a reference source of radiation for calibration of the video output voltage from camera 1. It should be noted that lamp 29, with its corresponding prism arrangement 27, can conveniently be positioned so that the source of light provided thereby preferably falls near the edge on the periphery of the field of the television camera whereby the corresponding bright spot created on the television monitor will be produced near the periphery of the display surface of the cathode ray tube thereof.

The function of reference lamp 29 will be made clear when it is recognized that variations in system parameters, such as, changes in the sensitivity of the television camera sensors or drift in the camera system, for example, act to change the level of the video signal, which change does not necessarily reflect a corresponding change in the temperature of the object under investigation. Accordingly, reference lamp 29 may be employed whereby periodic manual or automatic calibration of the video signal can be achieved. Lamp 29 may comprise, for example, a previously calibrated lamp with known filament temperature versus current characteristics.

After making adjustments for the difference in emissivity between the material of the filament of lamp 29 and the emissivity of the object under investigation, the slope of the video change, as a function of true temperature, can be determined. This can be achieved very simply, for example, by sampling the video signal corresponding to first and second known temperatures of lamp 29. The frequency with which the video signal is calibrated by using reference lamp 29 is dependent, it is clear, upon the particular application, the stability of the camera, the frequency with which camera adjustments must be made, and the like. It should be recognized that any of a variety of reference sources may, likewise, be employed for calibration of the camera, such as, a laser source.

After the video output voltage from television camera 1 has been calibrated to reflect absolute temperature by determining the slope and intercept of the temperature versus voltage function for the range of temperatures of interest, the system is readied for determination of absolute temperature at any point within the field of the camera. It should be recongnized that the very step of exhibiting the thermal profile of the object under investigation, may, in and of itself, provide information determinable by visual observation. More important, however, is the fact that the field of view of the television camera, in the perferred embodiment, can be broken into 50,000 parts, for example, and temperature measurements can be made every 33 milliseconds at each point within the field, by measuring the video voltage output signal therefor. It is clear that the entire field of view is scanned in 1/30th of a second and, accordingly, where points are selected, for example, by computer control, very rapid temperature data, from a multitude of points, is obtainable.

Figure 2:
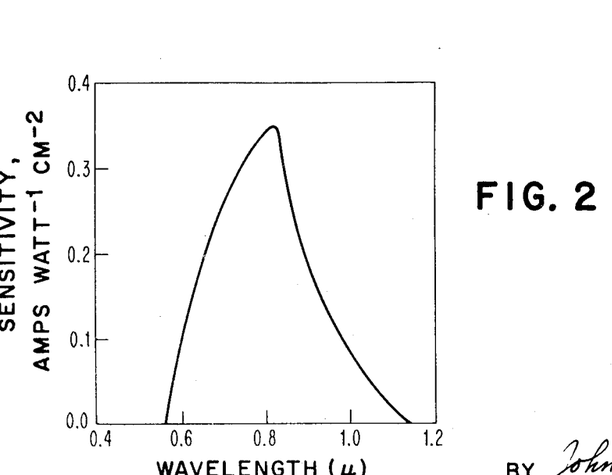
FIG. 2 shows a plot of sensitivity versus wavelength for an infrared television camera, exemplary of those which may be employed in the system of FIG. 1.

Before a description of the operation of the arrangement of FIG. 1 is given, reference should first be made to a description of FIG. 2 and 3. With reference to FIG. 2 it should be noted that the infrared television camera, as described above, is sensitive within the range of $0.5\mu$ to $1.2\mu$. Accordingly, it is clear that the wavelength and intensity of the light emitted by the hot surface being examined, affects sensitivity. It is also clear that the intensity of the emitted light must be sufficient to activate the light sensors, e.g., light sensivive diodes, in the television camera.

For the preferred TIVICON infrared television camera, as described above, the sensitivity to radiation of different wavelengths is given as described by the plot of FIG. 2. The temperature sensivity of the camera is typically 4mV/°C between 1300°C and 1460°C. This sensitivity is established by its wavelength range of sensitivity, the rate of change of radiant energy emitted by a hot surface as the temperature changes, the type of light filter used on the camera, for example, and the lens opening of the camera. From the Planck relationship, the change of radiance (watts/cm$^2$ - micron) with temperature, is large at $0.5\mu$ and $1\mu$ below 2,000°K. Above 5,000°K the change is very small for $1\mu$ and still significant for $0.5\mu$. Other wavelengths, $2\mu$ and higher, show much smaller rates of change above 1,000°K. It is to be noted that although the preferred infrared camera can only respond up to $1.2\mu$, at high temperatures (1400° C) the light intensity is so high that a silicon filter may be employed to limit the radiation to wavelengths above 1.1μ and still produce sufficient radiation for temperature measurements.

With regard to FIG. 3 there is shown detailed circuitry that may be employed for the reference level voltage sources 9 and 11, compare circuitry 5 and 7 and pulse generator 15. Accordingly, the horizontal and vertical reference level voltage sources 5 and 7, are shown in FIG. 3, being derived from a pair of potentiometer arrangements. The output from compare circuits 5 and 7 is coupled to the respective inputs of AND gate 39, the former via capacitor 35. It should be noted, here, that capacitor 35-resistor 37 comprise the differentiator within AND gate 13, in FIG. 1, at the same input thereof. The output of AND gate 39 is coupled to pulse generator 15, which comprises flip flop 31 having its set input coupled to the output of AND gate 39, and single shot 33 having its input coupled to the reset output of flip flop 31. Flip flop 31 is reset by voltage pulse $V_{R'}$ as will be explained hereinafter.

After the video output voltage from television camera 1 has been calibrated, via reference lamp 29, so as to be indicative of true temperature, the horizontal and vertical reference level voltage sources 9 and 11 may be adjusted to position the indicator dot, exhibited on the face of the cathode ray tube of monitor 21, to any selected point, within the field of view of camera 1, where it is determined to measure temperature. Assume, for example, that it is desired to measure the temperature at approximately the geometric center of object 3. Accordingly, the indicator dot on monitor 21 can be adjusted manually by the horizontal and vertical reference level voltage sources 9 and 11 until the dot is approximatly at that point.

Figure 4:
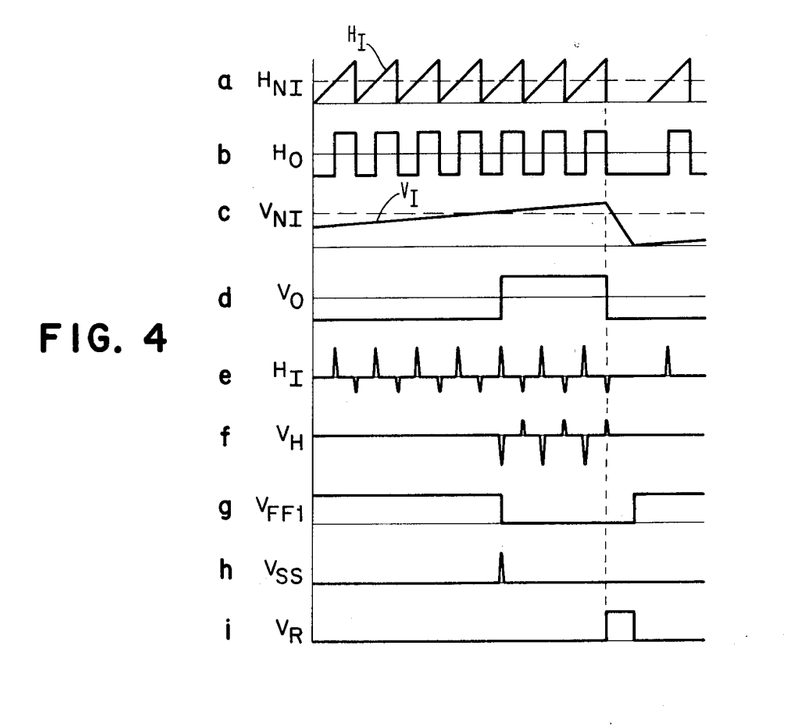
FIG. 4 shows a series of concurrent waveforms, to be used in the detailed explanation of the operation of FIGS. 1 and 2.

By referring to FIG. 4, the relative relationship of the horizontal and vertical reference level voltages to the respective horizontal and vertical deflection or sweep voltages of the television camera, can be seen. Thus, with regard to the horizontal reference level voltages $H_{NI'}$ it can be seen that compare circuit 5 in FIG. 1 produces a square wave output pulse $H_{O'}$ shown at $b$ in FIG. 4, for each cycle of horizontal deflection voltage $H_{I'}$ shown at $a$. However, compare circuit 7 does not produce an output indication until vertical deflection voltage $V_{I'}$ shown at $c$ in FIG. 4, has swept several horizontal lines, as determined by the horizontal deflection pulses $H_{NI}$. Thus when the vertical deflection voltage $V_I$ reaches the vertical reference level voltage $V_{NI}$ compare circuit 7 in FIG. 1 generates an output voltage $V_{O'}$ as shown at $d$ in FIG. 4. The waveform $H_{I'}$ as shown at $e$ in FIG. 4, represents the waveforms $H_{O'}$ at $b$ in FIG. 4, differentiated by, for example, capacitor 35-resistor 37, in FIG. 3.

The waveforms $V_O$ and $H_{I'}$ shown at $d$ and $e$, respectively, in FIG. 4 are each applied to AND gate 39, in FIG. 3. The output of AND gate 39 is represented by series of pulses $V_{H'}$ as shown as $f$ in FIG. 4. The initial one of these latter pulses acts to set flip flop 31, and an output $V_{FF1}$ is produced therefrom, as shown at $g$ in FIG. 4. As can be seen at $h$ in FIG. 4, the reseting of flip flop 31 acts to trigger single shot 33 whereby single output pulse $V_{SS}$ is produced. As shown by waveform $V_R$ at $i$ in FIG. 4, the vertical return pulse for a field of the television camera is employed to reset flip flop 31.

The significance of the $V_{SS}$ pulse, as shown at $h$ in FIG. 4, resides in the fact that the signal is produced at a point in time which corresponds to the point in time at which the video signal provides the video information corresponding to the point selected for the indicator dot on monitor 21. Thus, the timing aspect of pulse $V_{SS}$ is highly significant. As can be seen in FIG. 1, this marker pulse is mixed in mixer 19 with the video signal to produce, at the proper location, the indicator dot, on the monitor 21. Likewise, the marker pulse $V_{SS}$ is employed, as shown in FIG. 1, to enable sample ad hold circuit 17 to thereby sample, at this point in time, the video signal. The video signal, at this point in time is, it is clear, indicative of the true temperature of a point in the field of view of the television camera corresponding to the point selected for the indicator dot.

Figure 5:
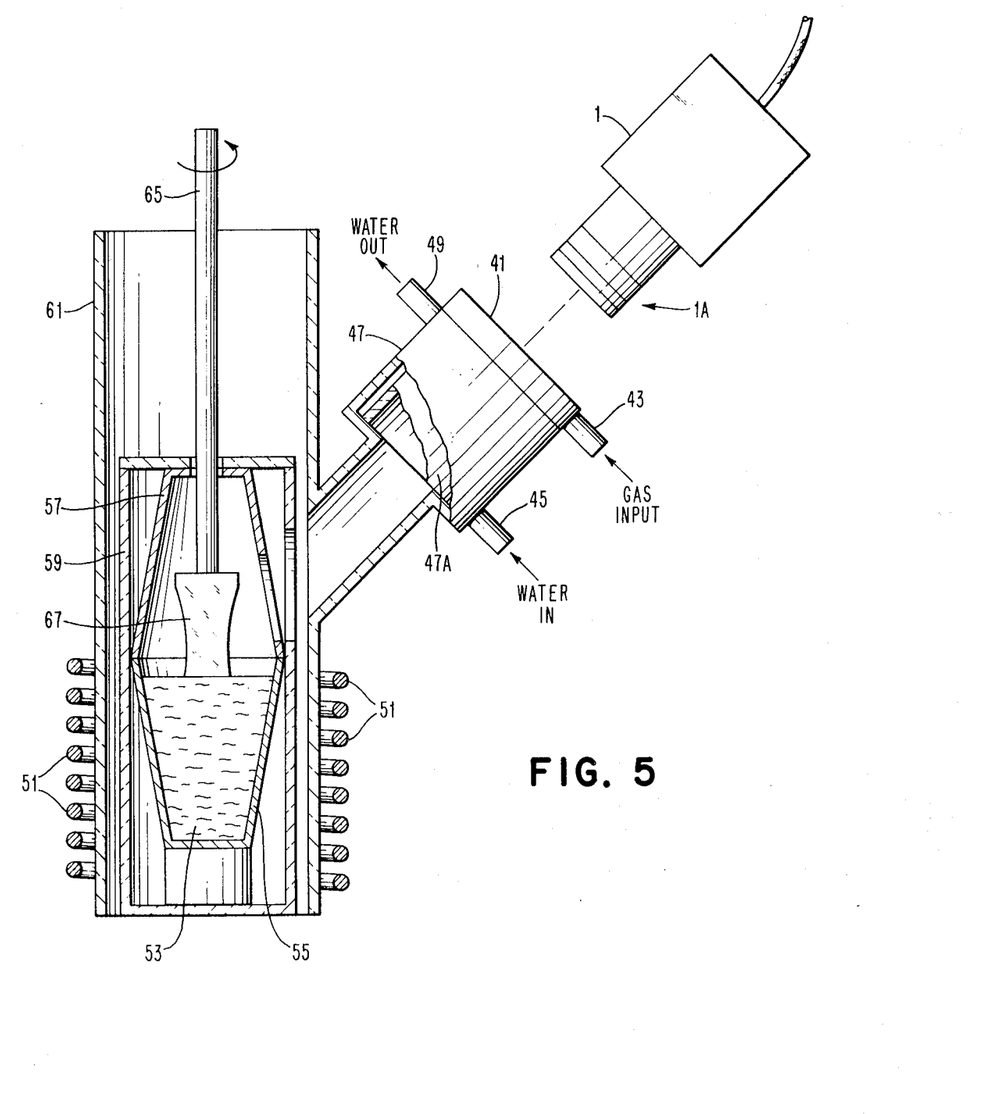
FIG. 5 shows a schematic of a Czochralski-type crystal puller arrangement, which arrangement represents an example of a preferred application of the monitoring system and method, in accordance with the principles of the present invention.

It is evident that the system and the method employed thereby, in accordance with the principles of the present invention, may be employed in any of a variety of applications whereby temperature profiles, point temperatures, widths and contour characteristics, for example, of any of a variety of objects, are required to be monitored, measured, and/or controlled. For example, a typical application of the system and method of the present invention is that of monitoring a Czochralski-type crystal puller process which is used to grow silicon, or the like. A preferred arrangement of this application is shown in FIG. 5. Knowledge of the temperatures that exist at various points in the processing environment of the Czochralski crystal puller are particularly important to successful crystal growth. In addition to knowledge of point temperatures, knowledge of temperature gradients on the crystal being pulled, the level of the melt, and distances, as for example, the width of the crystal being pulled, are also particularly important to the successful growth of crystals. It is clear that other types of crystal pulling processes, such as that of Gobat et al. in U.S. Pat. No. 3,173,765, may likewise be monitored.

As shown in FIG. 5, television camera 1, with filter arrangement 1A, is positioned to focus on viewing window 41, which may, for example, be fabricated from quartz. Some form of gas may be introduced at input orifice 43 and exhausted at any number of a plurality of exhaust orifices, circumscribed around the window. In accordance with such an arrangement the window is prevented from accumulating vapor and the like, which act to inhibit viewing. In addition, water is introduced at input orifice 45 so as to flow through a water jacket, contained within housing 47, as shown at 47A. The water is exited at exit orifice 49. It is evident that the flowing water acts to prevent condensation.

As can be seen in FIG. 5, RF coil 51 acts to provide heat to and regulate the temperature of melt 53, within crucible 55, the crucible, along with heat shield 56, being positioned in liner 59. Quartz tube 61, it can be seen, separates RF coils 51 from quartz liner 59. Shaft 65 rotates crystal 67 and as the crystal is gradually grown, it is slowly withdrawn, via shaft 65, from the melt 53.

In order to commence the growing of crystal 67 a seed crystal is initially employed. A difficult task is involved in initially wetting the seed crystal since the relative temperatures of the melt and crystal are particularly critical. Present techniques for wetting the seed crystal involves somewhat of a trial and error process. In accordance with the present invention, the temperature of the melt at the surface thereof and the temperature of the crystal seed, at its interface with the melt, can readily be determined. In addition, the temperature gradient that exists along the axis of rotation of the crystal, that corresponds to the axis of rotation of the shaft 65 in FIG. 5, can likewise readily be determined. Determining this temperature gradient is particularly important to obviating the problems encountered in regard to crystalline defects and cracks caused by extreme gradients. In addition, the extent to which the crystal "necks," as it inititally commences to grow, is also important in avoiding crystalline imperfections and defects.

Accordingly, not only can the system, in accordance with the present invention, measure the temperature gradient along the axis of rotation of crystal 67, in FIG. 5, but in addition, the width of crystal 67, taken orthogonal to the axis of rotation, for example, may likewise readily be determined. It is also clear that the relative temperature data of the melt and crystal, for example, can be utilized to control the diameter of the growing crystal and the rate of rotation and withdrawal of shaft 65.

It is clear that any of a variety of temperature data, and other parameters may be determined relative to the crystal puller arrangement of FIG. 5, in addition to those already mentioned, by way of example. As an additional example, it can be seen that by appropriately manually positioning the indicator dot, the liquid level of melt 53 can be determined. As an exemplary manner in which the width of crystal 67 in FIG. 5 may be measured, reference is made to the fact that crystal 67 is darker than its surrounding environment. Accordingly, as the television camera scans a line, orthogonal to the axis of rotation of crystal 67, a marked change in the video's signal will occur as the video camera scanning beams scans crystal 67. The leading and trailing edge of this marked change defines a pulse, the duration of which corresponds to the width of crystal 67. Accordingly, a threshold voltage level can be set between the video voltage level for the crystal region and the video voltage level for the region surrounding the crystal whereby a pulse indicative of width can be determined.

One particular manner in which the width measurement, as described above, can be implemented is by manually positioning the indicator dot on the television monitor to the left of crystal 67 in FIG. 5, somewhere in the vicinity between the crystal 67 and heat shield 57 on the horizontal line through which a measurement is to be made. In this regard it is assumed that camera 1 is positioned so that the horizontal sweep of the camera is orthogonal to the axis of rotation of the crystal, whereby a measurement of the width of the crystal can be determined. With the indicator dot of television monitor 21, of FIG. 1, positioned to the left of crystal 67, the particular horizontal line sweep which is to make the measurement, is thereby set. Thus, when the marker pulse $V_{ss'}$ as shown in FIG. 4, is generated, at the time corresponding to the time this particular line sweep reaches the indicator dot, it may be employed to, set a flip flop.

Figure 6:
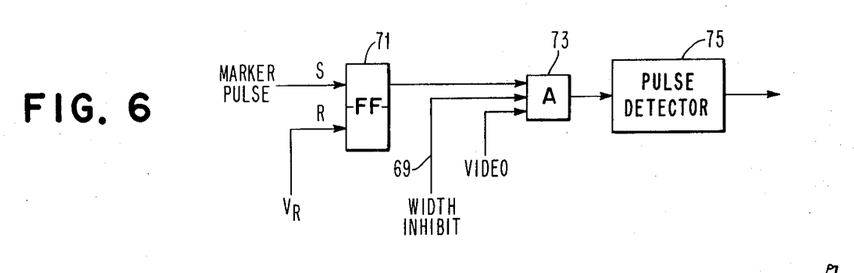
FIG. 6 shows an exemplary circuit which may be used in determining width measurement information from the video signal, obtained in accordance with the present invention.

An exemplary logical scheme that may be employed for this purpose is shown in FIG. 6. There, it can be seen, the marker pulse, obtained from FIG. 1, as described acts to set flip flop 71. The setting of flip flop 71 along with the removal of the inhibit level at input 69, acts to enable AND gate 73 and allow the video signal occuring thereafter, to be passed to pulse detector 75, whereby the video pulse, as described above, can thereby be detected.

It is clear, then, that the particular logical arrangement of FIG. 6 is enabled by marker pulse $V_{ss'}$ in response to the change in dc level at input 69, whereby the next pulse manifested by the video signal, for the line defined by the marker pulse (indicator dot) is detected. It is also clear that the duration of the detected video pulse is indicative of the width of the crystal, at the horizontal line, selected by the indicator dot, the duration occuring between the crystal boundaries. This latter video information, can be converted to digital information, indicative of width, via analog to digital converter 23, along with the other video information, from sample and hold circuit 17, to likewise be converted.

Another exemplary scheme for determining width would be to measure the temperature at every point on a selected horizontal line sweep across the crystal and, then, plot temperature versus position on the line. The abrupt change in temperature that occurs at each boundary of the crystal can be used to determine width. A computer can conveniently be used to achieve this end.

Although the system, and the method employed thereby, as shown in FIG. 1, has been described in terms of manually adjusting the indicator dot of television monitor cyclical so as to thereby define the point at which the video signal corresponding to temperature is to be extracted, it is clear that other means may be employed to select the desired points at which temperature is to be measured. Thus, a computer could be coupled to the inputs of compare circuits 5 and 7, shown in FIG. 1, and preselected store points therein employed to define the points at which temperature is to be determined. In accordance with such an arrangement many test points, at which temperature is to be determined, could very rapidly be processed, on a cylincal basis, if desired. In addition, it is clear, that the computer so connected could be coupled to receive the digital output from analog to digtial converter 23 and the information received therefrom utilized to decide which future points are to be selected by the computer. For example, the computer could be programmed to follow the contour of an object under investigation, such as crystal 67 in FIG. 5. Such a scheme could be implemented by programming the computer to follow the contour of crystal 67, via a hunting approach, whereby the contour would be traversed by alternately going back and forth between the black and white pulses on each side of the contour line, the pulses being indicative of the dark crystal and light background therefor.

It is readily apparent that either with, or without, the utilization of a computer, the system of FIG. 1 can be employed to control the process acting upon the object being investigated. Thus, as suggested above, the power input to the melt, the speed of rotation and the rate of withdrawal of shaft 65 of the Czochralski crystal puller, as shown in FIG. 5, can be controlled by a computer, with the computer determining the power input and the speeds and rates in accordance with decisions made on the basis of previously obtained data, the data being obtained under program control, for example.

While the invention has been particularly shown and described with reference to a preferred embodiment thereof, it will be understood by those skilled in the art that various changes in form and details may be made therein without departing from the spirit and scope of the invention.

What is claimed is:

1. A method of detecting radiation emission indicative of the heat produced at selected points on objects, comprising the steps of:

positioning an infrared television camera so that the objects from which emission is to be detected are placed within the field of view of said camera;

selecting points within the field of view of said camera at which the emission is to be detected, said points being visually selectable using a television monitor having displayed upon its display surface said objects and a moveable indicator which is selectively positionable with respect thereto in accordance with horizontal and vertical voltage levels manually selected using a respective pair of potentiometers, said potentiometers acting to establish horizontal and vertical voltage levels corresponding to the respective horizontal and vertical position of said selected points in said field of view of said camera;

comparing the respective horizontal and vertical sweep voltages of said television camera with the selected horizontal and vertical voltage levels; and sampling the video signal at a point in time when both said horizontal and vertical sweep voltages compare with the respective selected voltage levels to thereby produce the video signal for said selected points.

2. The method as set forth in claim 1 wherein said objects include a crystal being grown in a Czochralski type crystal puller.

3. The method as set forth in claim 1 wherein said detecting involves measuring said radiation emission and wherein the magnitude of said sampled video signal is indicative of the magnitude of radiation emitted at the selected point.

4. The method as set forth in claim 3 wherein said measuring involves temperature measuring and said sampled video signal is indicative of the temperature at said selected points.

5. The method as set forth in claim 4 wherein a reference radiation emission source of known temperature is placed within the field of view of said camera and the voltage level of said video signal is calibrated in accordance therewith by sampling the reference radiation therefrom so that said video voltage is indicative of absolute temperature.

6. The method as set forth in claim 5 wherein said objects include a crystal being grown in a Czochralski type crystal puller.

7. The method as set forth in claim 6 including the further step of using rapid changes in the level of said video signal to measure the width of said crystal.

8. A system for monitoring the radiation emitted by objects at any of a plurality of selected points on said objects with said radiation at said selected points being indicative of temperature thereat, comprising:

infrared television camera means positioned so that said objects are within the field of view of said camera means;

radiation emission reference means positioned within the field of view of said television camera means for calibrating said camera means so that the video signal therefrom is indicative of absolute temperature, said radiation emission reference means providing emitted radiation at known temperatures of the emission source thereof;

means to select points on said objects at which the radiation emitted is to be determined;

means to sample the video signal from said camera means at points in time corresponding to the points in time when said camera means is producing the video signal for said selected points, said sampled video signal being indicative of the absolute temperature at the selected points, said means to sample the video signal including means to sample the video signal where there is a marked change in video level indicative of object boundaries so as to thereby obtain information from the sampled signal as to the widths of said objects.

9. The system as set forth in claim 8 wherein said objects include a crystal being grown in an Czochralski-type crystal puller.

10. A system for monitoring the temperature profile of objects and determining the temperature at selected points on said objects comprising:

infrared television camera means having a video output signal therefrom and positioned so that said objects are within the field of view of said camera means;

video display means coupled to receive the said video output signal from said infrared television camera means so as to display the temperature profile of said objects on the display surface thereof;

radiation emission reference means positioned within the field of view of said infrared television camera means for calibrating said camera means so that the video signal therefrom is indicative of absolute temperature, means to select points on said objects at which temperature is to be determined, said means to select points including indicator means positionable upon the display surface of said video display means so that points at which the temperature is to be determined may be manually selected thereby; and means to sample the video signal from said camera means at points in time corresponding to the points in time when said camera means is producing the video signal corresponding to said selected points, said sampled video signal being indicative of the temperature at the selected points.

11. A system for monitoring the temperature profile of objects and measuring the temperature at selected points on said objects comprising;

infrared television camera means having a video output signal and positioned so that said objects are within the field of view of said camera means so as to thereby produce a video output signal representative of said view;

television monitor means coupled to receive the said video output signal from said infrared television camera means so as to display the temperature profile of said objects thereon;

indicator means positionable upon the display surface of said monitor means for selecting points thereon and producing horizontal and vertical signals indicative of the location of the selected points; and means coupled to both said indicator means for receiving said horizontal and vertical signals therefrom and to said camera means for receiving said video output signal therefrom to cause the sampling of said video signal at points corresponding to the points selected by said indicator means, in accordance with said horizontal and vertical signals therefrom.

12. The system as set forth in claim 11 further including radiation emission reference means positioned within the field of view of said infrared television camera means for periodically calibrating said camera meaNs so that the said video output signal therefrom is accurately indicative of absolute temperature.

13. The system as set forth in claim 12 wherein said indicator means for selecting points, includes potentiometer means to manually position said indicator on the said display surface of said monitor means, said potentiometer means to manually position including means to produce horizontal and vertical voltage levels to be compared with the magnitude of the respective horizontal and vertical sweep voltage of said infrared television camera means.

14. The system as set forth in claim 13 wherein the horizontal and vertical voltage levels are respectively compared to the horizontal and vertical sweep voltages of said infrared television camera means in a respective pair of compare circuits and wherein the output from said compare circuits is coupled to pulse generator means for generating a marker pulse in response to coincident output signals from the respective compare circuits, said marker pulse being coupled to said television monitor means and a sample and hold circuit means for sampling the video output signal from said infrared television camera means at the time of occurrence of, and in accordance with the width of, said marker pulse.

* * * * *